US012344237B2

(12) United States Patent
Tam et al.

(10) Patent No.: US 12,344,237 B2
(45) Date of Patent: Jul. 1, 2025

(54) VIRTUAL HAZARD INFERENCE SYSTEM

(71) Applicant: NISSAN NORTH AMERICA, INC., Franklin, TN (US)

(72) Inventors: Qizhan Tam, Stanford, CA (US); Christopher Ostafew, Mountain View, CA (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 358 days.

(21) Appl. No.: 17/958,228

(22) Filed: Sep. 30, 2022

(65) Prior Publication Data
US 2024/0109533 A1  Apr. 4, 2024

(51) Int. Cl.
*B60W 30/09* (2012.01)
*B60W 30/095* (2012.01)

(52) U.S. Cl.
CPC ........ *B60W 30/09* (2013.01); *B60W 30/0956* (2013.01)

(58) Field of Classification Search
CPC ............. B60W 30/09; B60W 30/0956; B60W 2554/20; B60W 2554/4026; B60W 10/06; B60W 10/20
See application file for complete search history.

(56) References Cited

U.S. PATENT DOCUMENTS

| 10,146,223 | B1* | 12/2018 | Luders | .............. B32B 5/26 |
| 2019/0384302 | A1* | 12/2019 | Silva | ............... B60W 60/00272 |
| 2021/0031760 | A1* | 2/2021 | Ostafew | ............... B60W 30/09 |
| 2024/0035842 | A1* | 2/2024 | Witwicki | ........... G01C 21/3461 |

* cited by examiner

Primary Examiner — Russell Frejd
Assistant Examiner — Ana D Thomas
(74) Attorney, Agent, or Firm — Global IP Counselors, LLP

(57) ABSTRACT

A vehicle includes a vehicle engine, a steering control unit, an on-board sensor network and a virtual hazard inference system. The vehicle engine generates a torque output of the vehicle. The steering control unit controls a steering angle of the vehicle. The on-board sensor network is programmed to detect external objects within a detection zone. The virtual hazard inference system has a processor programmed to infer a presence of an occluded object that is not detected by the on-board sensor network. The processor controls the vehicle engine and the steering control unit to perform at least one of a torque control operation and a steering control operation.

20 Claims, 9 Drawing Sheets

VIRTUAL HAZARD INFERENCE SYSTEM

BACKGROUND

Technical Field

The present disclosure generally relates to a virtual hazard inference system. More specifically, the present disclosure relates to a virtual hazard inference system for a vehicle.

Background Information

Autonomous or semi-autonomous vehicles can accelerate, decelerate, change lanes or alter navigation course and stop without human intervention. Autonomous and semiautonomous vehicles can keep in the desired lane, and can potentially also be able to park themselves.

SUMMARY

In view of the state of the known technology, one aspect of the present disclosure is to provide a vehicle comprising a vehicle engine, a steering control unit, an on-board sensor network and a virtual hazard inference system. The vehicle engine generates a torque output of the vehicle. The steering control unit controls a steering angle of the vehicle. The on-board sensor network is programmed to detect external objects within a detection zone. The virtual hazard inference system has a processor programmed to infer a presence of an occluded object that is not detected by the on-board sensor network. The processor controls the vehicle engine and the steering control unit to perform at least one of a torque control operation and a steering control operation.

In view of the state of the known technology, another aspect of the present disclosure is to provide a method for controlling a vehicle based on an inferred virtual hazard. The method comprises detecting a presence of external objects within a detection zone by an on-board sensor network. The method further comprises inferring a presence of an occluded object that is not detected by the on-board sensor network by a processor of a virtual hazard inference system. The method further comprises controlling a vehicle engine of the vehicle by the processor to decrease a torque output to decelerate the vehicle upon determining the presence of the occluded object.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
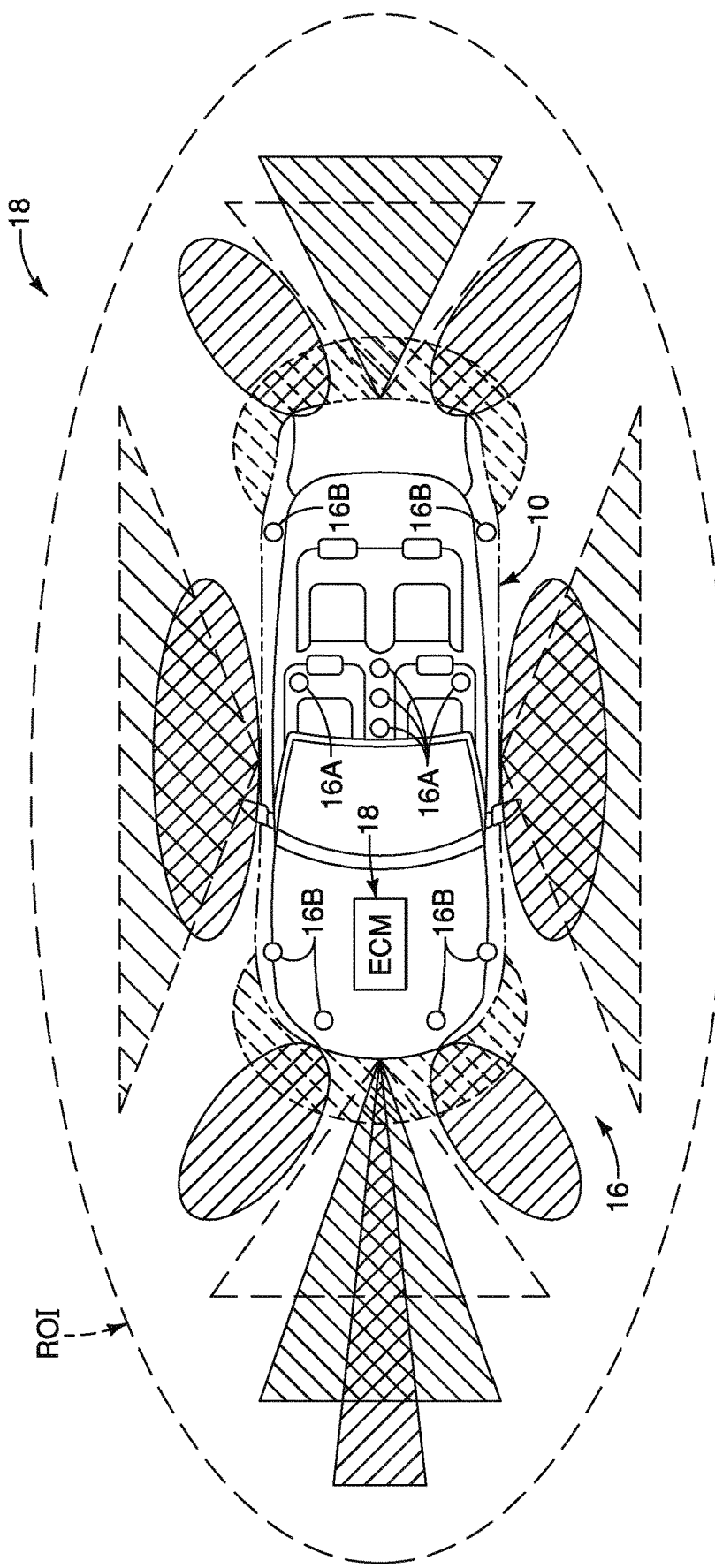
FIG. 1 is a schematic plan view of a vehicle equipped with a virtual hazard inference system in accordance with an illustrated embodiment.
Figure 2:
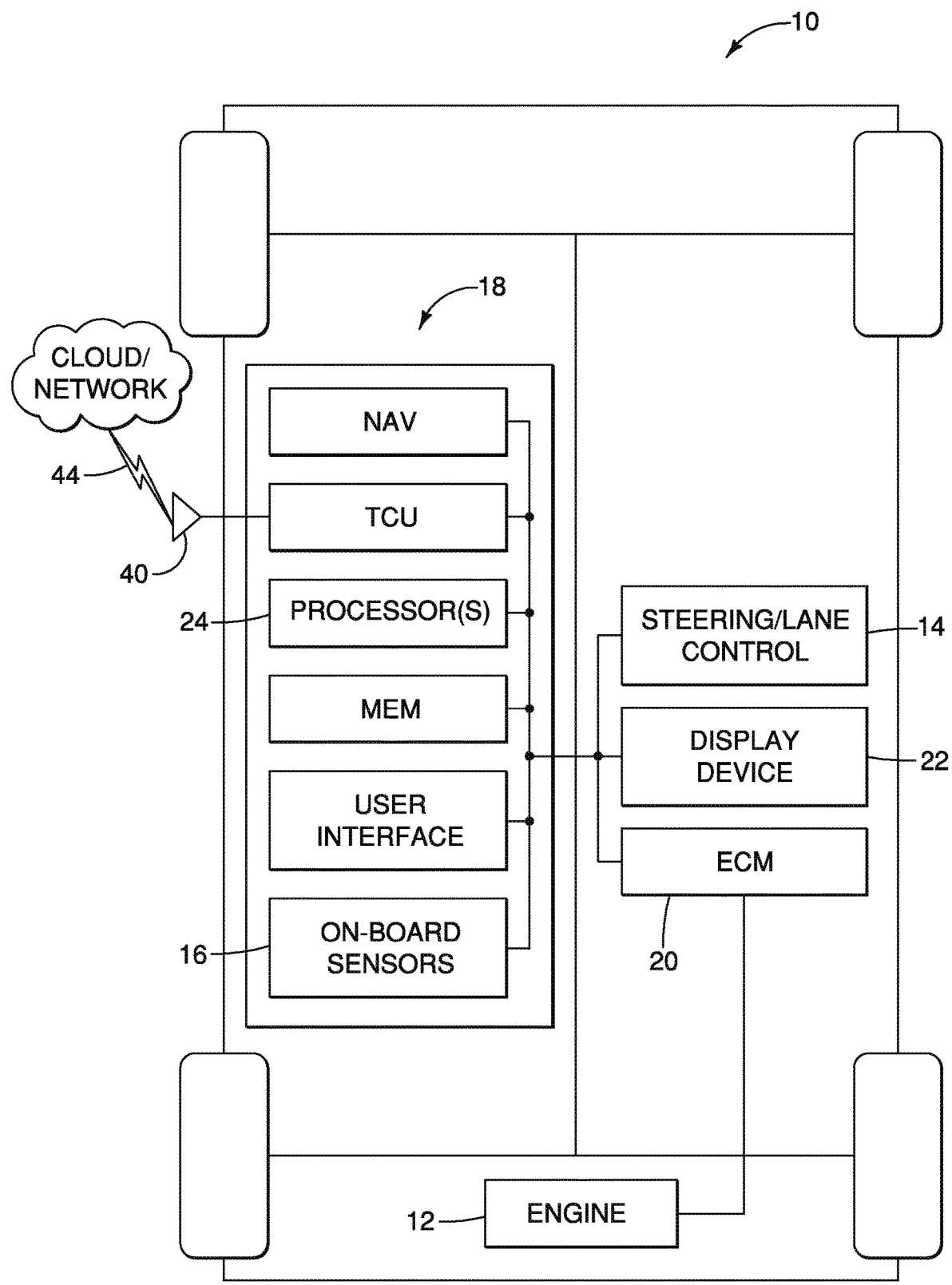
FIG. 2 is schematic view of the components of the virtual hazard inference system of the vehicle.

Referring initially to FIG. 1, a vehicle 10 is schematically illustrated as being equipped with a vehicle engine 12, a steering control unit 14, an on-board sensor network 16 and a virtual hazard inference system 18. In the illustrated embodiment, the vehicle 10 is equipped with an on-board satellite navigation device NAV and a telematics control unit TCU, as best seen in FIGS. 1 and 2. The telematics control unit TCU is in wireless communications to at least one of a cloud services and a vehicle network to upload and receive crowdsourced information regarding conditions near the vehicle's 10 vicinity.

The on-board satellite navigation device NAV and the telematics control unit TCU are considered examples of control modules for navigation assistance. The on-board sensor network 16 monitors both internal and external conditions of the vehicle 10. That is, the on-board sensor network 16 includes internal sensors 16A to monitor conditions regarding the vehicle 10 interior, such as the vehicle's 10 passenger compartment. The on-board sensor network 16 further includes environmental sensors 16B that monitor conditions regarding the vehicle 10 vicinity, as will be further discussed below.

For example, the vehicle 10 can be equipped with one or more unidirectional or omnidirectional external cameras that take moving or still images of the vehicle 10 surroundings. In addition, the external cameras can be capable of detecting the speed, direction, yaw, acceleration and distance of the vehicle 10 relative to a remote object. The environmental sensors 16B can also include infrared detectors, ultrasonic detectors, radar detectors, photoelectric detectors, magnetic detectors, acceleration detectors, acoustic/sonic detectors, gyroscopes, lasers or any combination thereof. The environmental sensors 16B can also include object-locating sensing devices including range detectors, such as FM-CW (Frequency Modulated Continuous Wave) radars, pulse and FSK (Frequency Shift Keying) radars, sonar and Lidar (Light Detection and ranging) devices. The data from the environmental sensors 16B can be used to determine information about the vehicle's 10 vicinity, as will be further described below.

Preferably, the internal sensors 16A preferably includes at least one internal unidirectional or omnidirectional camera positioned to detect behavior of one or more passengers in the passenger compartment. The on-board sensor network 16 can include one or more microphone(s). The on-board sensor network 16 detects a region of interest ROI for the vehicle 10. The region of interest ROI includes an area within a navigation path 20 of the vehicle 10, and the areas adjacent to and within the vicinity of the navigation path 20.

The on-board sensor network 16 is programmed to detect external objects E within a detection zone (e.g., the region of interest ROI). In the illustrated embodiment, for simplicity, the region of interest ROI is illustrated to correspond to the detection zone that is detected by the on-board sensor network 16. However, it will be apparent to those skilled in the vehicle field from this disclosure that the region of interest can include areas beyond the detection zone of the on-board sensor network 16.

As shown in FIGS. 5 to 9, the vehicle 10 is preferably further equipped with an electronic display device 22 configured to display the navigation path 20 and the region of interest ROI to the driver. The electronic display device 22 is positioned an interior compartment of the vehicle 10. The electronic display device 22 is in communication with the virtual hazard inference system 18 of the illustrated embodiment. The electronic display device 22 can be a display screen (such as a navigational screen) positioned on the vehicle's 10 dashboard. The electronic display device 22 can alternatively been a mobile device screen.

The virtual hazard inference system 18 includes an electronic control unit ECU controlling the electronic display device 22 to display the navigation path 20 and the region of interest ROI. In particular, the ECU includes one or more processor(s) 24 for controlling the operation of the virtual hazard inference system 18 of the vehicle 10, as will be further described. Therefore, the virtual hazard inference system 18 includes one or more processor(s) 24 for controlling the components of the virtual hazard inference system 18.

The vehicle engine 12 generates a torque output of the vehicle 10 in accordance with the operation of the vehicle pedal (not shown) by the driver. The vehicle engine 12 generates a torque output that is created by the pistons within the engine as they reciprocate up and down along the engine's crankshaft. The torque output generated by the engine is then transferred to the vehicle's 10 wheels through the vehicle's 10 transmission and drivetrain.

The vehicle engine 12 is further equipped with an electronic control unit ECM. In particular, the ECM controls a torque output of the vehicle engine 12. The ECM monitors the sensors in the vehicle's 10 engine bay (not shown) in order to manage the vehicle's 10 air-fuel mixture and regulate the emissions control of the engine, such as the air-fuel ratio, idle speed, variable valve timing, ignition timing, etc. The on-board sensor network 16 can further include mass airflow sensor(s), the oxygen sensor(s), air-fuel sensor(s) that are in connection with the ECM. The on-board sensor network 16 preferably further includes sensors located by the vehicle's 10 crankshaft and camshafts so that the ECM can determine the vehicle's 10 idle speed, or the revolutions per minute (RPM) and engine load.

The vehicle 10 can include an internal combustion engine. Alternatively, the vehicle 10 can be a hybrid or an electric vehicle, or be operated by a hydrogen powertrain. Therefore, the ECM and the torque control operation described herein can be provided for any of these types of vehicles.

Preferably, the onboard sensor network also includes a vehicle speed sensor and a torque sensor. The vehicle speed sensor is capable of measuring the vehicle's 10 transmission output or can measure wheel speed in a conventional manner. Therefore, the vehicle speed sensor is configured to detect a current speed of the vehicle 10. The torque sensor can be a torque transducer that is capable of measuring and monitoring the torque on a rotating system, such as the engine's crankshaft. The torque sensor can convert a torsional mechanical input into an electrical output signal. Therefore, the torque sensor is configured to detect a current torque of the vehicle 10. In the illustrated embodiment, the vehicle speed sensor and the torque sensor are in electrical communication with the ECM to send and receive signals to and from the ECM. These sensors controlled by the ECM can be considered part of the internal sensors 16A of the on-board sensor network 16.

The vehicle 10 is further equipped with a steering control unit 14 that controls a steering angle of the vehicle. The steering control unit 14 includes a controller that uses steering angle, acceleration, vehicle speed, and brake commands so that the vehicle 10 follows the navigation path 20. The steering control unit 14 can be part of an intelligent Advanced Driver Assistance System (ADAS) that helps the driver through a human-machine interface by following the lane departure warning system, a Lane Keeping Assistance System (LKAS), a Forward Collision Warning System, and/or a Smart Parking Assistant System (SPAS).

The steering control unit 14 can additionally be a motor-driven power steering (MDPS) system that can produce heavier steering effort depending on the increase in vehicle speed. The MDPS system reduces a driver's effort by providing assist torque and return torque based on an electric motor.

The steering control unit 14 is a path tracking system that controls a steering actuator (not shown) based on the current vehicle's 10 position, heading information, and reference path from the NAV. The steering control unit 14 controls the steering actuator to follow the navigation path 20 which serves as a reference path for vehicle travel. In the illustrated embodiment, the processor(s) 24 controls the vehicle engine 12 and the steering control unit 14 to perform at least one of a torque control operation and a steering control operation. In particular, the processor(s) 24 of the virtual hazard inference system 18 controls the torque output and the steering of the vehicle 10 based on an inferred virtual hazard V within the vehicle's 10 region of interest ROI, as will be further described below.

Referring again to FIGS. 1 and 2, the vehicle's 10 control modules for navigation assistance will now be further discussed. The NAV is in communication with a global positioning system unit (GPS) to acquire real-time information regarding conditions near the vehicle's 10 vicinity. In particular, the on-board satellite navigation device NAV is in communication with the global positioning system unit GPS to acquire real-time information regarding conditions near the vehicle's 10 vicinity. The on-board satellite navigation device NAV can be a global navigation satellite system (GNSS) receiver or GPS receiver that is capable of receiving information from GNSS satellites then calculate the device's geographical position. Therefore, the on-board satellite navigation device NAV acquires GPS information for the vehicle 10.

Figure 3:
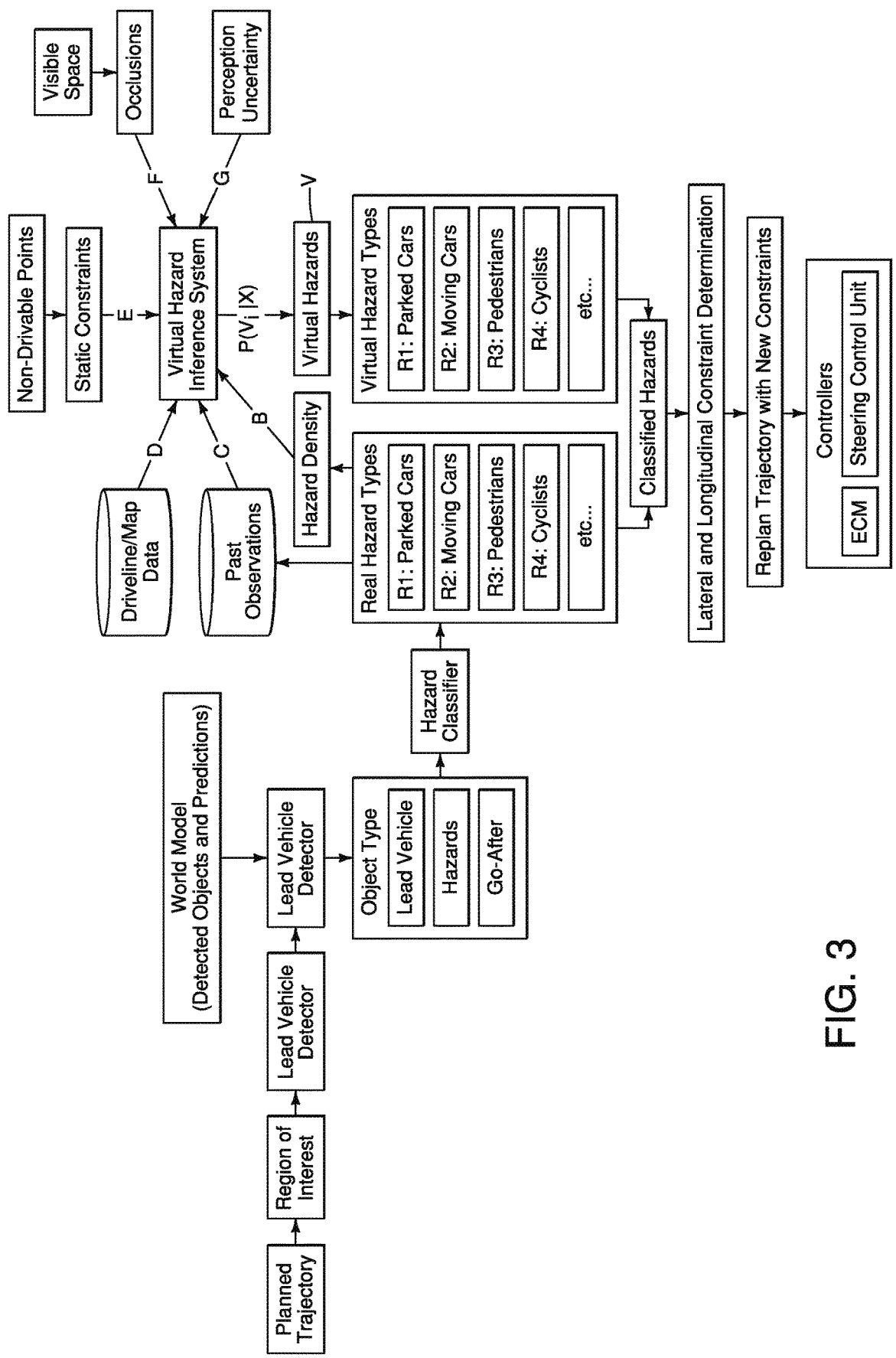
FIG. 3 is a diagrammatic view of the virtual hazard inference system.

As shown in FIG. 3, the on-board satellite navigation device NAV can also be in communication with a Wide Area Augmentation System (WAAS) enabled National Marine-Electronics Association (NMEA) unit, a radio triangulation unit, or a combination thereof. The on-board satellite navigation device NAV can obtain information that represents, for example, a current heading of the vehicle 10, a current position of the vehicle 10 in two or three dimensions, a current angular orientation of the vehicle 10, or a combination thereof. In this way, the on-board satellite navigation device NAV captures real-time information regarding conditions regarding the vehicle's 10 vicinity.

In the illustrated embodiment, the virtual hazard inference system 18 is controlled by the processor(s) 24. The processor(s) 24 can include any device or combination of devices capable of manipulating or processing a signal or other information now-existing or hereafter developed, including optical processors, quantum processors, molecular processors, or a combination thereof. For example, the processor(s) 24 can include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof.

As used herein, the terminology "processor(s)" 24 indicates one or more processor(s), such as one or more special purpose processor(s), one or more digital signal processor(s), one or more microprocessor(s), one or more controllers, one or more microcontrollers, one or more application processor(s), one or more Application Specific Integrated Circuits, one or more Application Specific Standard Products; one or more Field Programmable Gate Arrays, any other type or combination of integrated circuits, one or more state machines, or any combination thereof.

The virtual hazard inference system 18 also includes a computer readable medium MEM that serves as a computer memory for the virtual hazard inference system 18. As seen in FIG. 2, the processor(s) 24 is operatively coupled with the computer readable medium MEM, the sensor network 16, the TCU, the NAV, and the display device 22 (and preferably a user interface for the display device 22).

As used herein, the terminology "memory" or "computer-readable medium MEM" (also referred to as a processor-readable medium) indicates any computer-usable or computer-readable medium MEM or device that can tangibly contain, store, communicate, or transport any signal or information that may be used by or in connection with any processor(s) 24. For example, the computer readable medium may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

Therefore, the computer-readable medium MEM further includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media can include, for example, optical or magnetic disks and other persistent memory. Volatile media may include, for example, dynamic random access memory (DRAM), which typically constitutes a main memory.

The computer readable medium MEM can also be provided in the form of one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The MEM can be programmed to store map data for the virtual hazard inference system 18. For example, the MEM can store metric maps, tele-operated maps, and recorded navigation path 20s from previous trips. The MEM can also store temporary data received from the on-board sensor network 16, such as perceived lane markings and traffic signs. This information stored in the MEM can be used by the processor(s) 24 to generate a navigation path 20 for the vehicle 10. Additionally, this data can be used as threshold data for estimating or changing the navigation path 20, as will be further described below.

The processor(s) 24 can execute instructions transmitted by one or more transmission media, including coaxial cables, copper wire and fiber optics, including the wires that comprise a system bus coupled to a processor(s) 24 of a computer. As used herein, the terminology "instructions" may include directions or expressions for performing any method, or any portion or portions thereof, disclosed herein, and may be realized in hardware, software, or any combination thereof.

For example, instructions may be implemented as information, such as a computer program, stored in memory that may be executed by a processor(s) 24 to perform any of the respective methods, algorithms, aspects, or combinations thereof, as described herein. In some embodiments, instructions, or a portion thereof, may be implemented as a special purpose processor(s) 24, or circuitry, that may include specialized hardware for carrying out any of the methods, algorithms, aspects, or combinations thereof, as described herein. In some implementations, portions of the instructions may be distributed across multiple processor(s) on a single device, on multiple devices, which may communicate directly or across a network such as a local area network, a wide area network, the Internet, or a combination thereof.

Computer-executable instructions can be compiled or interpreted from computer programs created using a variety of programming languages and/or technologies, including, without limitation, and either alone or in combination, Java™, C, C++, Visual Basic, Java Script, Perl, etc. In general, the processor(s) 24 receives instructions from the computer-readable medium MEM and executes these instructions, thereby performing one or more processes, including one or more of the processes described herein. Such instructions and other data may be stored and transmitted using a variety of computer-readable media.

For example, the processor(s) 24 can also use information from the environmental sensors 16B to identify, the type of road (e.g., type of lanes and lane segments, urban or highway), difficulty of traversal of lane(s) and lane segment(s), density of traffic, the level of the density, etc. In the illustrated embodiment, the processor(s) 24 is programmed to anticipate information regarding upcoming conditions near the vehicle 10 vicinity based on one or more of the real-time information received from the on-board satellite navigation device NAV, the crowdsourced information and the predetermined information (stored in the computer readable medium).

As stated, the non-transitory computer readable medium MEM stores predetermined information or threshold information for the virtual hazard inference system 18. For example, the non-transitory computer readable medium MEM includes one or more database of road conditions or situations. The database can include a set of road feature parameters that can be applicable for almost all navigation path 20s along a road feature or intersection (e.g., intersection type, ongoing traffic control(s), lane types and numbers, lane angles, etc.).

Referring now to FIG. 3, hazard detection of the virtual hazard inference system 18 will now be discussed. The on-board sensor network 16 detects external objects E within the region of interest, including hazards such as other vehicles, bicyclists and pedestrians. External objects E can include objects that are or can potentially move into the vehicle's 10 navigation path 20. As stated, the environmental sensors 16B (e.g., lidar, cameras, or radar) detect the external objects E within the region of interest.

The navigation path 20 is established based on GPS input information into the vehicle's 10 NAV or crowdsourced information via the TCU. The navigation path 20 can also be established based on the vehicle's 10 perceived drive plan if the driver is not using GPS guidance. That is, the virtual hazard inference system 18 can infer that the navigation path 20 is one in which the vehicle 10 is proceeding straight on its current path.

In the illustrated embodiment, the processor(s) 24 is programmed to update the navigation path 20 of the vehicle 10 based on one or more inferred virtual hazard V(s) within the region of interest or detected area. The virtual hazards V are external objects E to the vehicle 10 but are occluded from detection by the environmental sensors 16B, as will be further discussed below. Virtual hazards V can also include external objects E that are outside of the vehicle's 10 detection zone. Therefore, in the illustrated embodiment, virtual hazards V includes external objects E not detected by the on-board sensor network 16 but may be in or in the vicinity of the vehicle's 10 region of interest ROI.

In the illustrated embodiment, the virtual hazard inference system 18 is programmed to maintain or to update the navigation path 20 approximately every 0.1 seconds based on information received by the environmental sensors 16B. Preferably, That is, the virtual hazard inference system 18 generates a dynamic vehicle navigation path 20 every six seconds during a trip. In addition to detecting external objects E, the environmental sensors 16B also detect road indicators such as lane markings, navigation signs, navigation lights, etc. in order to maintain or update the navigation path 20.

As stated, the virtual hazard inference system 18 has one or more processor(s) 24 programmed to infer a presence of an occluded object (i.e., virtual hazard V) that is not detected by the on-board sensor network 16. That is, the virtual hazard inference system 18 includes a virtual hazard inference system 18 that is executed by the processor(s) 24, as seen in FIG. 3. The inferred virtual hazard V is based on a determined probability of the presence of the virtual hazard V and that the virtual hazard V may be in motion such that the virtual hazard V can be a hazard to the vehicle 10.

Figure 6:
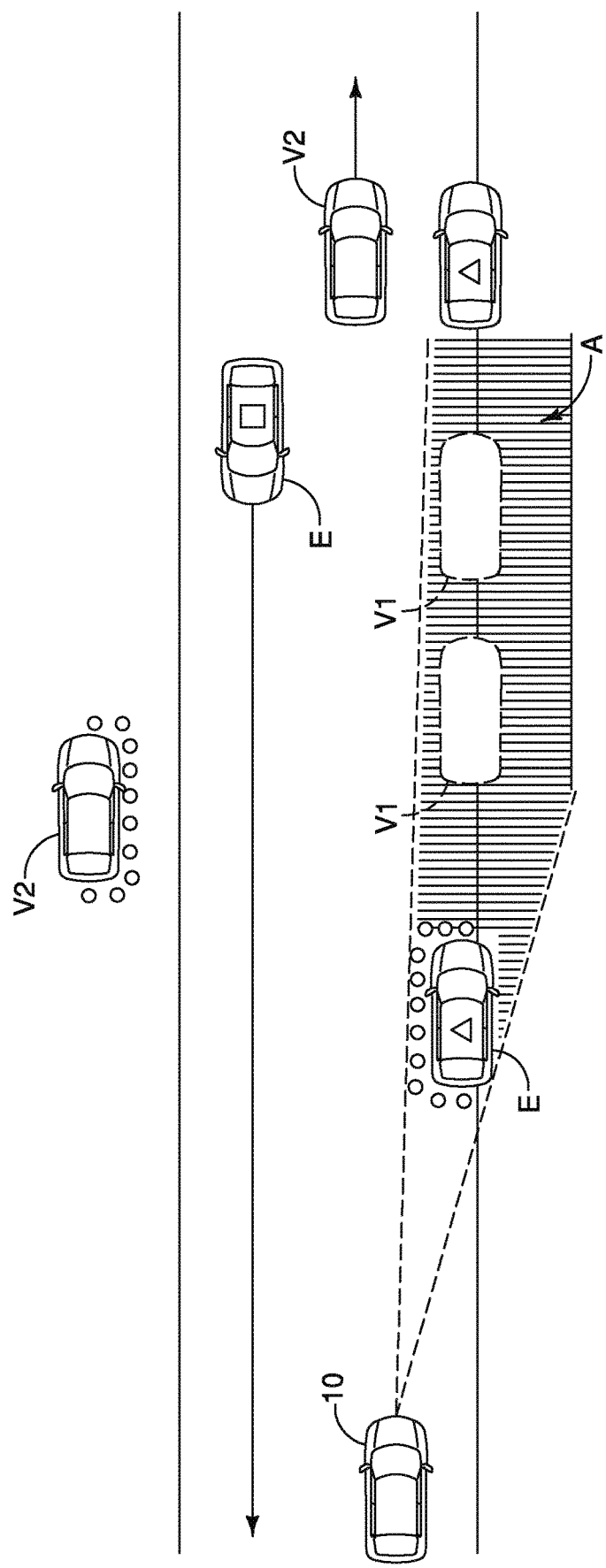
FIG. 6 is a schematic view of a third driving scenario encountered by the vehicle equipped with the virtual hazard inference system showing an occluded area that is occluded from the vehicle's on-board sensors.

The inferred location of the virtual hazard V is based on occluded areas A, which are areas that are occluded from detection by the environmental sensors 16B but still within or near the vehicle's 10 region of interest ROI. In the illustrated embodiment, the occluded areas A can be determined by ray-tracing across the region of interest ROI from the environmental sensors 16B, as seen in FIG. 6. If there are objects or non-drivable points within the region of interest ROI, the area is considered an occluded area, such as the right parking lane shown in FIG. 4. In the illustrated embodiment, the probability of an occluded object or virtual hazard V increases as the number of occluded areas A increases. Therefore, processor(s) 24 of the virtual hazard inference system 18 is more likely to infer the presence of an occluded object when the areas of determined occluded areas A increases.

Figure 4:
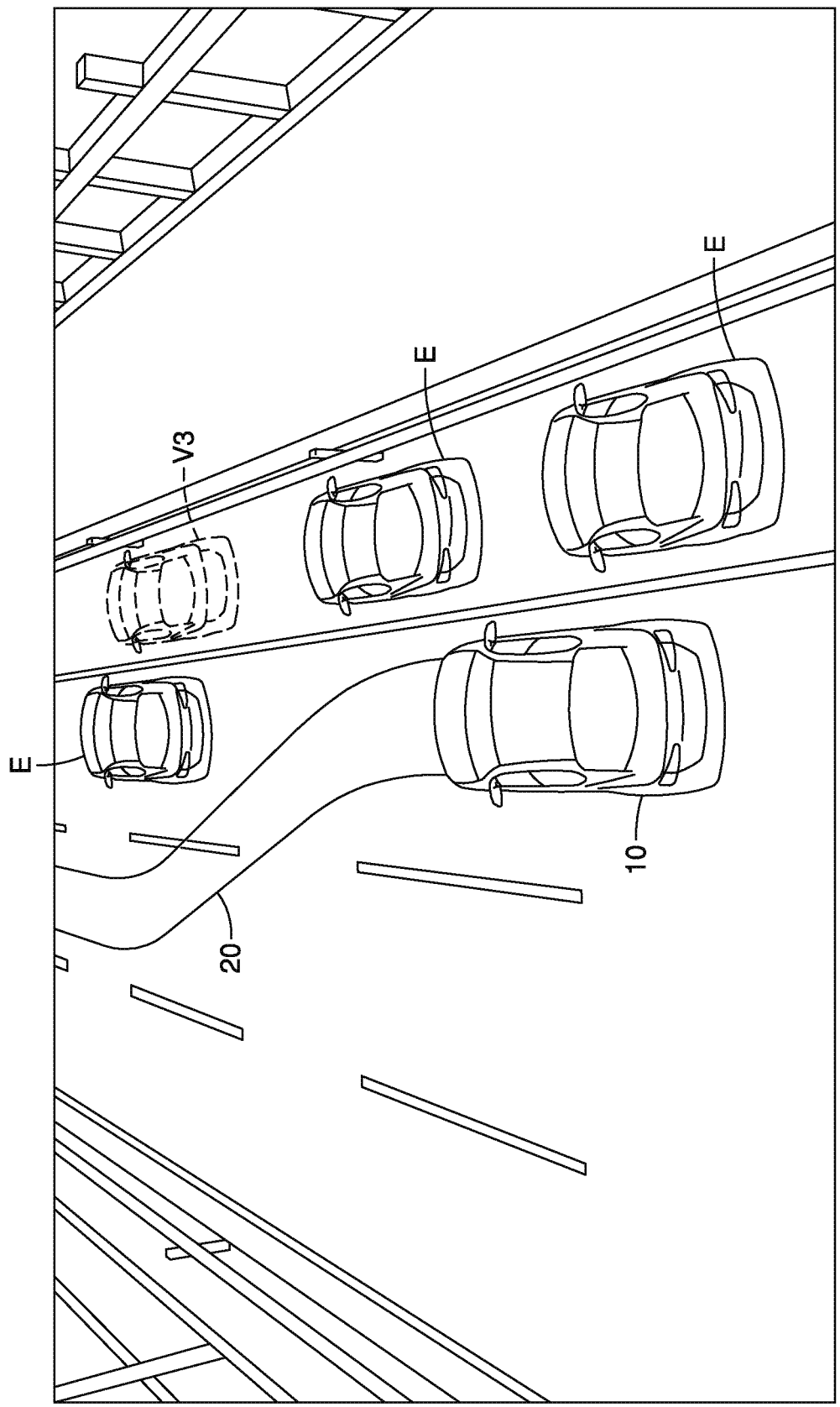
FIG. 4 is a schematic view of a first driving scenario encountered by the vehicle equipped with the virtual hazard inference system.

In another example, in the case of city or heavily populated residential driving, the virtual hazard inference system 18 can infer that the virtual hazard V can be another vehicle (such as the vehicles V1 in FIGS. 6 and 7) due to the probability of congested vehicles in these driving conditions. That is, it is common to find parked cars in city or residential driving, such as shown in FIG. 4. If the density of detected parked vehicles reaches a prestored threshold (e.g., three or more within a ten meter square radius of the vehicle 10), the virtual hazard inference system 18 begins to "fill in" undetected space(s) or area(s) between detected parked vehicles with "virtual" parked vehicles.

In the illustrated embodiment, the virtual hazard inference system 18 is programmed to "fill in" the occluded areas A upon determining a prestored threshold has been reached. In the illustrated embodiment, the prestored threshold can include a density of detected external objects E, such as a density of vehicles, pedestrians, bicyclists, etc. In the illustrated embodiment, the predetermined threshold can also include a detected level or type of lane positioning. That is, the predetermined threshold can include a detected series of upcoming lane merges (e.g., two or more upcoming lane merges within the region of interest) to trigger filling in of occluded areas A because the processor(s) 24 can infer that other vehicles will try to merge ahead of the vehicle 10.

The prestored threshold can also include a threshold of occluded areas A within the region of interest ROI, or any perception uncertainty experienced by the environmental sensors 16B. For example, if the environmental sensors 16B are experiencing a threshold value of false negative rates that exceeds an expected value for their specifications, the processor(s) 24 can begin to infer virtual hazards V within the region of interest ROI. Additionally, if the vehicle 10 is traveling in a foggy area or under poor weather conditions that can affect the on-board sensors' performance, the processor(s) 24 can begin to infer the presence of occluded objects or virtual hazards V within the occluded areas A.

These values for the predetermined thresholds can be prestored in the MEM. The MEM can also store past vehicle navigation experiences within the same area and base upcoming inferences of virtual hazards V based on these past experiences. That is, if in the past the vehicle 10 encountered occluded objects that moved within the navigation path 20 within the same region of interest, the vehicle 10 can infer similar virtual hazards V for future trips to the same region of interest. For example, FIG. 3 illustrates how past vehicle experiences of actual or virtual hazards in the area can inform the current classification of virtual hazards.

Figure 5:
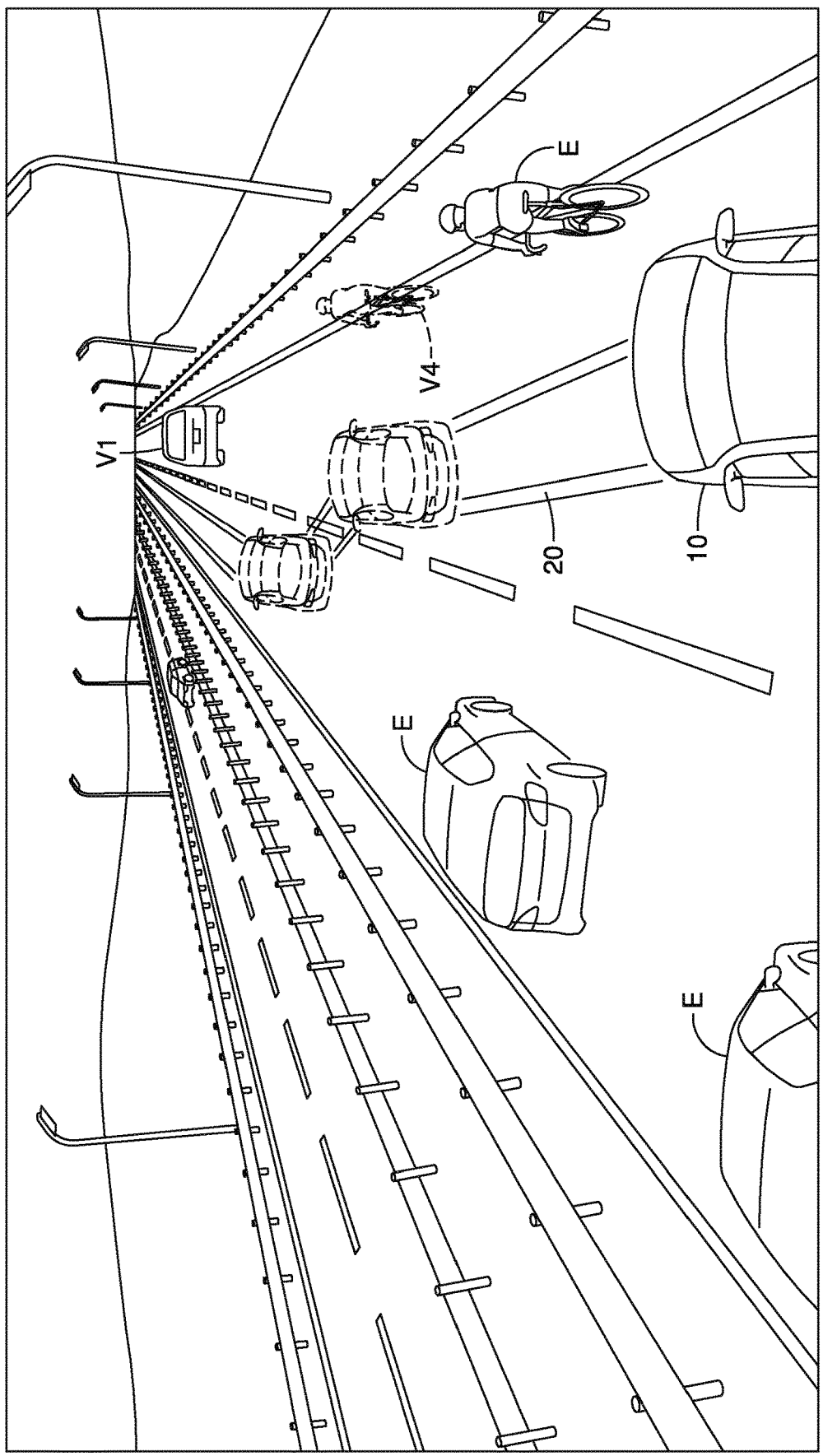
FIG. 5 is a schematic view of a second driving scenario encountered by the vehicle equipped with the virtual hazard inference system.

In another example, when the environmental sensors 16B detect the presence of cyclists within the vehicle's 10 region of interest ROI, the processor(s) 24 can infer cyclists within occluded areas A of the region of interest ROI as virtual hazard V, as seen in FIG. 5. That is, the bicycle E is an external object that is detected by the environmental sensors 16B, but the bicycle V4 is a virtual hazard V that is occluded by the bicycle E. The bicycle V4 is inferred due to the presence of other bicycles in the vicinity, e.g., the bicycle E. Similarly, if the environmental sensors 16B detect the presence of a pedestrians within the region of interest ROI, the processor(s) 24 can infer the presence of pedestrians within occluded areas A of the region of interest ROI as virtual hazards V.

As shown in FIG. 3, all of these factors can be used as the basis for initiating inference of virtual hazards V. That is, the processor(s) 24 begins inferring virtual hazards V upon determining that the probability of occluded objects having reached a predetermined level. The probability of the presence of an undetected hazard A can be depicted by:

$$P_i = P(A|X) \text{ wherein } X \in \{B,C,D,E,F,G\}$$

These factors for determining probability are also shown in FIG. 3. If the probability $P_i$ exceeds a minimum threshold, $P_{min}$, a virtual hazard V is instantiated in the area.

Preferably, the processor(s) 24 of the virtual hazard inference system 18 only "fills in" or infers virtual hazards V in areas not detected by the environmental sensors 16B (e.g., only in the occluded areas A). That is, the virtual hazard inference system 18 does not infer virtual hazards V in the detected areas or the region of interest ROI that are detected by the environmental sensors 16B. Additionally, the processor(s) 24 can infer that the virtual hazards V are parked vehicles with the potential of moving into the vehicle's 10 navigation path 20, or has the potential of a vehicle door opening or having a pedestrian moving into the vehicle's 10 navigation path 20. Therefore, the processor(s) 24 can control the vehicle 10 such that the navigation path 20 is modified as seen in FIG. 4.

Once the processor(s) 24 infers virtual hazards V or occluded objects, the virtual hazard inference system 18 further includes a hazard classifier module, schematically shown in FIG. 3, that is executed by the processor(s) 24. That is, the processor(s) 24 further classifies the occluded objects or inferred virtual hazards V. For example, the processor(s) 24 can classify virtual hazards V as parked vehicle(s) V1, moving vehicle(s) V2, pedestrian(s) V3, bicyclist(s) V4, etc. Therefore, the processor(s) 24 is further programmed to classify the one or more hazards as one of a mobile hazard and a stationary hazard. In particular, based on the detected external objects E, the processor(s) 24 can infer whether the virtual hazard V is mobile or stationary. In another example, in an area in which a lot of parked vehicles are detected within the region of interest, the processor(s) 24 can infer virtual hazards V as other parked vehicles V1 in the occluded areas A.

In an area in which a lot of moving vehicles or bicyclists are detected, the processor(s) 24 can infer virtual hazards V as other mobile hazards in the occluded areas A. Therefore, the processor(s) 24 is further programmed to determine a probability that the region of interest ROI includes an occluded hazard based on classifying the detected hazards. As shown in FIG. 3, the probability of occluded hazards in the ROI is also based on past experiences of the vehicle 10 in the same region and whether the vehicle experienced past virtual or actual hazards in the region. The processor(s) 24 is programmed to control the vehicle engine 12 to decelerate the vehicle 10 or controls the steering control unit 14 to alter the steering angle of the vehicle 10 upon determining that the probability exceeds a predetermined threshold.

For example, as seen in FIG. 4, the vehicles E are external objects E that are parked vehicles V1 and their presence is detected by the environmental sensors 16B. The processor(s) 24 can then infer the presence of the parked vehicle V1 as a virtual hazard V that is a parked vehicle based on the presence of the parked vehicles E. The processor(s) 24 can assume that the parked vehicle V3 can become mobile to move into the vehicle's 10 navigation path 20. Therefore, the processor(s) 24 can modify the navigation path 20 away from the vehicles E and V1 accordingly.

Figure 7:
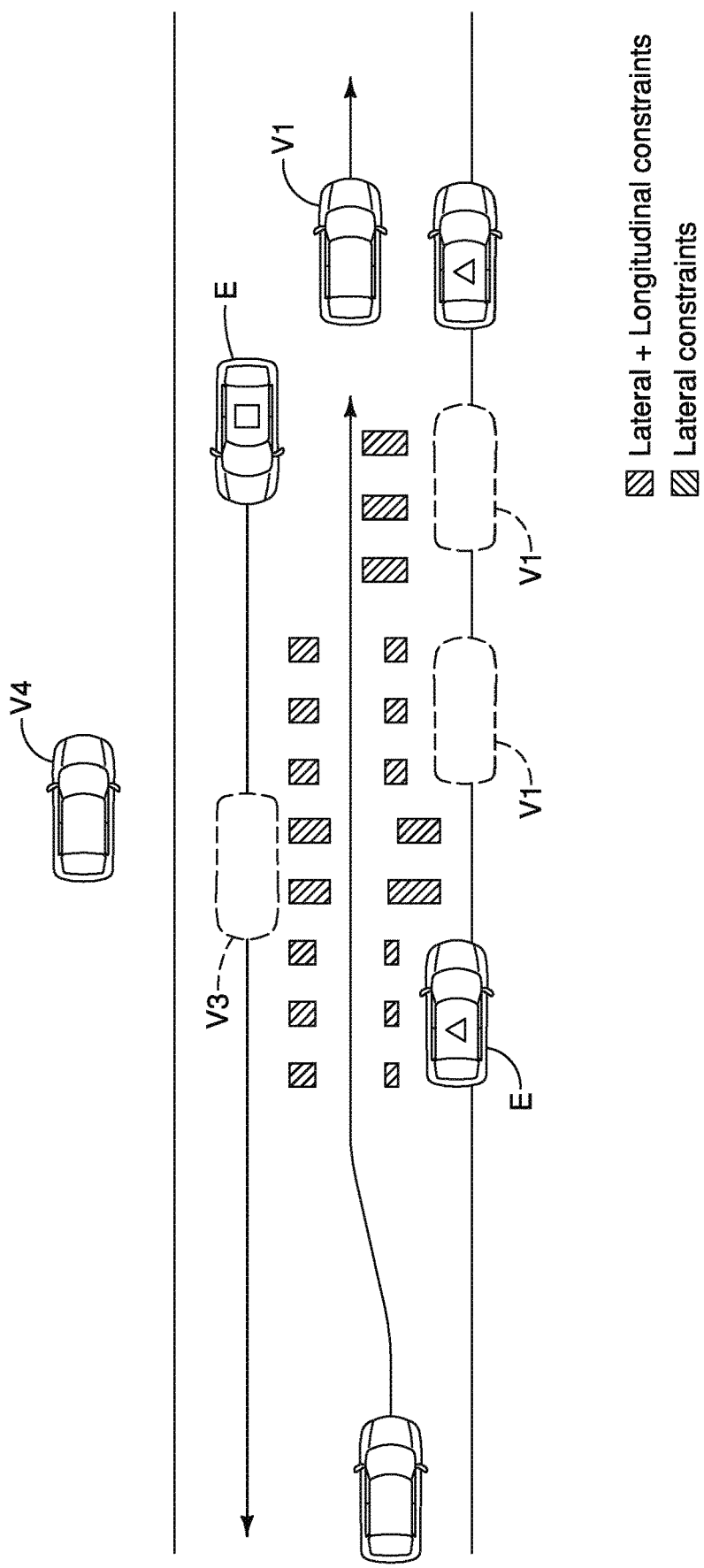
FIG. 7 is a schematic view similar to FIG. 6 showing longitudinal and lateral constraint determinations by the virtual hazard inference system upon determining virtual hazards within the vehicle's region of interest.
Figure 8:
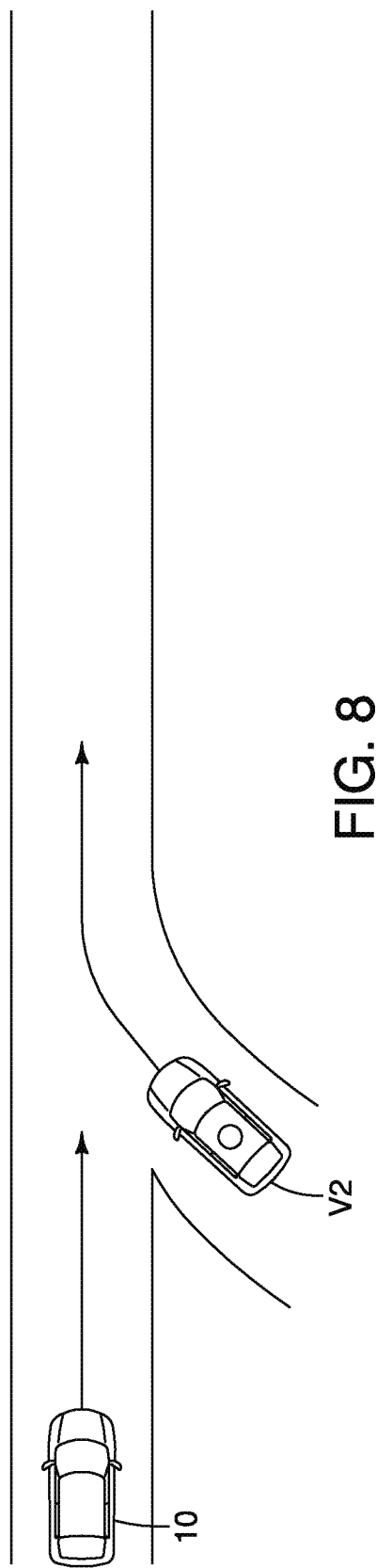
FIG. 8 is a schematic view of a fourth driving scenario encountered by the vehicle equipped with the virtual hazard inference system.

In addition to hazards, the processor(s) 24 is further programmed to classify other types of external objects E that are detected. For example, the processor(s) 24 can also classify a go-after object (e.g., a merging vehicle that is merging into the vehicle's lane as seen in FIG. 8), or as not relevant to vehicle control. Referring to FIG. 6, the processor(s) 24 can infer a virtual hazard V as in an adjacent lane that is detected by the environmental sensors 16B, and assume that the detected vehicle E is traveling towards the vehicle 10. The processor(s) 24 can then infer an upcoming virtual hazard vehicle V2 as the detected vehicle E is moving towards the vehicle 10, as shown in FIG. 7. As a result, the processor(s) 24 control the torque output and the steering control such that the navigation path 20 would steer away from the adjacent lane as appropriate.

Therefore, the process of the processor(s) 24 can be summarized as follows: The processor(s) 24 determines an initial navigation path 20 based on GPS input or current driving patterns. The navigation path 20 also accounts for non-drivable areas or static constraints (e.g., sidewalks) as determined by the environmental sensors 16B. The processor(s) 24 then determines the region of interest ROI along the navigation path 20. For detected hazards, the processor(s) 24 classifies these as mobile or stationary such as a parked cars, moving cars, pedestrians, cyclists, occlusions, etc.

As described above, the virtual hazard inference system 18 infers virtual hazards V in occluded areas A based on probability that occluded areas A having undetected hazards ($P_i > P_{min}$?). The probability is based on the classification of detected external objects E, the density of the detected external objects E, and/or the probability of sensors experiencing perception uncertainty due to bad weather, etc. Once a prestored threshold probability is reached, the virtual hazard inference system 18 infers a virtual hazard V in the occluded area(s). The virtual hazard inference system 18 can then determine any lateral and/or longitudinal (e.g., speed) constraints based on the inferred hazards, as schematically shown in FIG. 7. As shown, the longitudinal and lateral constraints are determined based on other detected external objects E and virtual hazards V. If yes, then the navigation path 20 is adjusted accordingly. In the illustrated embodiment, the virtual hazard inference system 18 is programmed to control the vehicle engine 12 to decrease the torque output to decelerate the vehicle 10 upon determining the presence of the occluded object. The processor(s) 24 determination of longitudinal and/or lateral constraints can be similar to that as disclosed in U.S. Patent Application Publication No. 20210031760A1.

If the virtual hazard inference system 18 adjusts the speed of the vehicle 10, the speed is adjusted according to a determined average speed of the detected hazards that are detected within the region of interest or within a determined radius around the virtual hazard V. The determined radius can be based on a size of the inferred virtual hazard V which can be based on the detected sizes of the detected objects. The determined radius can be pre-stored in the MEM.

For example, if the virtual hazard inference system 18 has inferred a virtual hazard V within the region of interest ROI to be a cyclist, the virtual hazard inference system 18 can then infer a speed of the cyclist based on a predetermined radius of approximately ten (10) meters. In another example, if the virtual hazard inference system 18 has inferred a virtual hazard V within the region of interest ROI that is a pedestrian, the virtual hazard inference system 18 infer a speed of the pedestrian based on a predetermined radius of approximately two (2) meters. In the event that the processor(s) 24 determines that none of the detected external objects E are moving, the processor(s) 24 is programmed to infer the speed of the occluded object based on an average size of the detected external objects E within the detection zone of the on-board sensor network 16.

The processor(s) 24 is further programmed to infer a speed of the occluded object is moving based on an average speed of detected external objects E within the region of interest ROI of the on-board sensor network 16. Therefore, the virtual hazard inference system 18 is preferably programmed to assume that the speed of the virtual hazard V would correspond to the speed of the surrounding objects (the detected hazards). The virtual hazard inference system 18 assumes that the virtual hazard V is moving in the direction towards the vehicle 10. The virtual hazard inference system 18 can then modify the navigation path 20 based on the inferred speed of the virtual hazard V towards the vehicle 10.

As stated, in the illustrated embodiment, the virtual hazard inference system 18 is equipped with one or more processors(s) (e.g., the ECM) that controls the vehicle engine 12 and the steering control unit 14 to perform at least one of a torque control operation and a steering control operation. That is, the processor(s) 24 is programmed to control the vehicle engine 12 to decrease the torque output to decelerate the vehicle 10 upon determining the presence of the occluded object because the processor(s) 24 is programmed to automatically infer that the occluded object is moving in a direction towards the vehicle's 10 navigation path 20, such as the virtual hazard V2 that is determined to be another vehicle moving towards the vehicle 10 in FIG. 7. The processor(s) 24 is programmed to control the steering control unit 14 to alter the steering angle of the vehicle 10 upon determining the presence of the occluded object such that the steering control unit 14 steers the vehicle 10 in a direction away from the occluded object.

Therefore, in the illustrated embodiment, the processor(s) 24 is programmed to determine a region of interest ROI based on information received by the on-board sensor network 16. The processor(s) 24 is then further programmed to classify one or more hazards in the region of interest ROT. If the processor(s) 24 determines a virtual hazard V that is an occluded object is in the region of interest, the virtual hazard V is further assumed to be an external object that is capable of moving into the vehicle's navigation path 20. The processor(s) 24 is programmed to infer the presence of the occluded object based at least one of a density of external objects E within the detection zone, previous navigation experience in the detection zone, a range of the detection zone, information acquired by the satellite navigation device, and information acquired by the telematics control unit and on-board sensor network 16.

Figure 9:
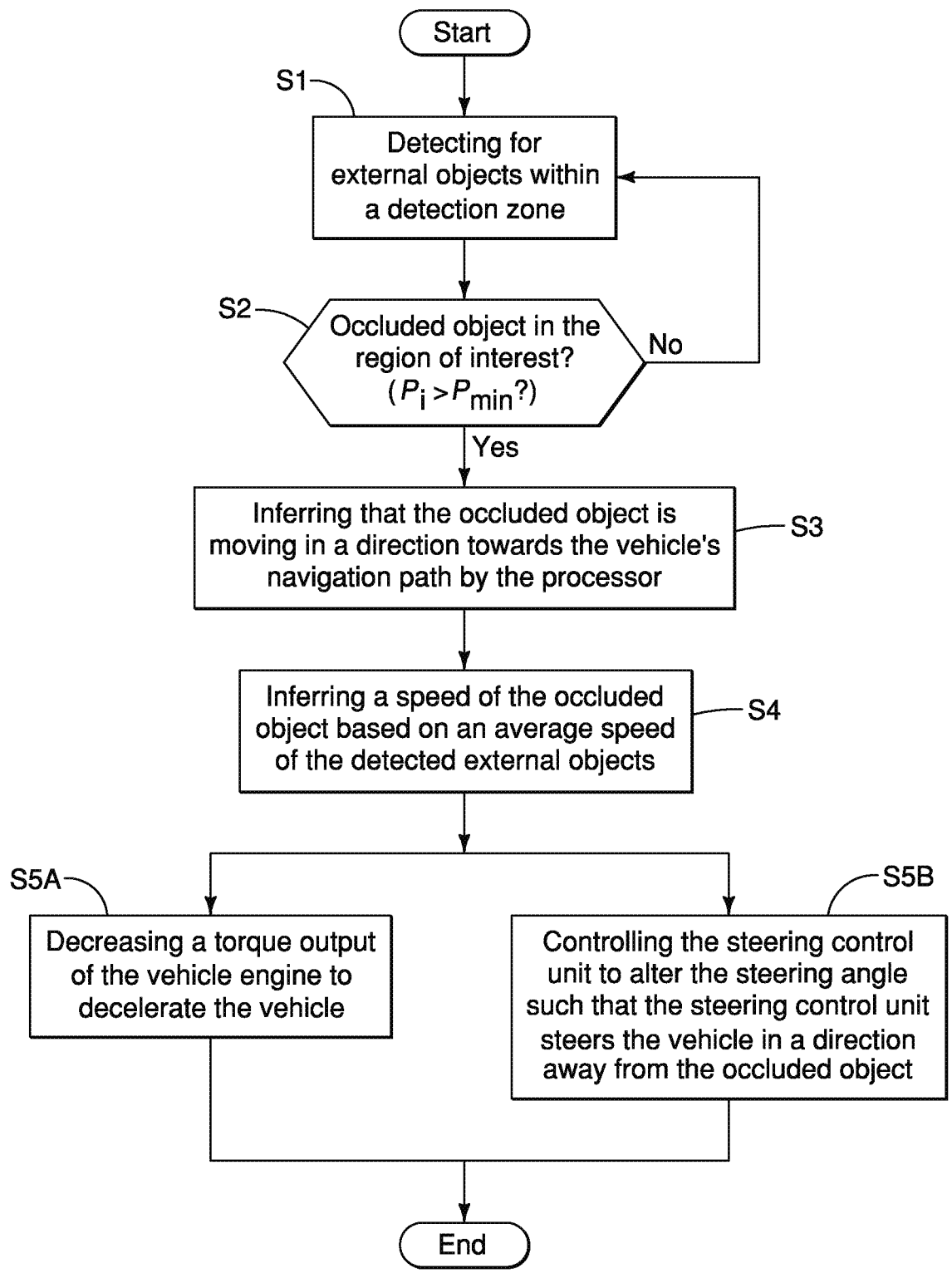
FIG. 9 is a flowchart of some of the processes of the virtual hazard inference system.

Referring now to FIG. 9, a method for controlling a vehicle based on an inferred virtual hazard V is illustrated in accordance with an embodiment. As stated above, "occluded object" refers to "virtual hazard." The method can be executed by the processor(s) 24 of the virtual hazard inference system 18 in conjunction with the other components of the virtual hazard inference system 18. In step S1, the method comprises detecting a presence of external objects E within a detection zone by the vehicle's 10 on-board sensor network 16. In step S2, the processor(s) 24 infers a presence of an occluded object (virtual hazard V) that is not detected by the on-board sensor network 16.

In the illustrated embodiment, the processor(s) 24 are programmed to infer the presence of the occluded object by the processor(s) 24 based at least one of a density of external objects E within the detection zone, previous navigation experience in the detection zone, a range of the detection zone, information acquired by the satellite navigation device, and information acquired by the telematics control unit and on-board sensor network 16.

In step S3, the processor(s) 24 infers that the occluded object is moving in a direction towards the vehicle's 10 navigation path 20. In step S4, the processor(s) 24 infers a speed of the occluded object based on an average speed of the detected external objects E. In the illustrated embodiment, the processor(s) 24 infers the speed of the occluded object based on an average size of the detected external objects E within the detection zone of the on-board sensor network 16 by the processor(s) 24 in the event that the processor(s) 24 determines that none of the detected external objects E are moving.

In step S5A, the processor(s) 24 controls the vehicle engine 12 to decrease a torque output to decelerate the vehicle 10 upon determining the presence of the occluded object. In step S5B, the processor(s) 24 controls the steering control unit 14 to alter the steering angle of the vehicle 10 upon determining the presence of the occluded object such that the steering control unit 14 steers the vehicle in a direction away from the occluded object.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the virtual hazard inference system. Accordingly, these terms, as utilized to describe the present invention should be interpreted relative to a vehicle equipped with the virtual hazard inference system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle comprising:
a vehicle engine generating a torque output of the vehicle;
a steering control unit controlling a steering angle of the vehicle;
an on-board sensor network programmed to detect external objects within a detection zone; and
a virtual hazard inference system having a processor programmed to infer a presence of an occluded object that is not detected by the on-board sensor network based on a density of detected external objects in the detection zone, the processor controlling the vehicle engine and the steering control unit to perform at least one of a torque control operation and a steering control operation.

2. The vehicle according to claim 1, wherein
the processor of the virtual hazard inference system is programmed to control the vehicle engine to decrease the torque output to decelerate the vehicle upon determining the presence of the occluded object.

3. The vehicle according to claim 2, wherein
the processor of the virtual hazard inference system is programmed to cause an adjustment to a navigation path of the vehicle upon determining the presence of the occluded object.

4. The vehicle according to claim 1, wherein
the processor of the virtual hazard inference system is programmed to control the steering control unit to alter the steering angle of the vehicle upon determining the presence of the occluded object such that the steering control unit steers the vehicle in a direction away from the occluded object.

5. The vehicle according to claim 1, wherein
the processor of the virtual hazard inference system is programmed to automatically infer that the occluded object is moving in a direction towards the vehicle's navigation path.

6. The vehicle according to claim 5, wherein
the processor of the virtual hazard inference system is further programmed to infer a speed that the occluded object is moving based on an average speed of detected external objects within the detection zone of the on-board sensor network.

7. The vehicle according to claim 6, wherein
in the event that the processor determines that none of the detected external objects are moving, the processor is programmed to infer the speed of the occluded object based on an average size of the detected external objects within the detection zone of the on-board sensor network.

8. The vehicle according to claim 1, further comprising
an on-board satellite navigation device in communication with a global positioning system unit to acquire real-time information regarding conditions near the vehicle's vicinity, and
a telematics control unit in wireless communication with at least one of a cloud services and a vehicle network to upload and receive crowdsourced information regarding conditions near the vehicle's vicinity.

9. The vehicle according to claim 8, wherein
the processor of the virtual hazard inference system is further programmed to infer the presence of the occluded object based at least one of
previous navigation experience in the detection zone,
a range of the detection zone,
information acquired by the satellite navigation device, and
information acquired by the telematics control unit and on-board sensor network.

10. The vehicle according to claim 1, wherein
the processor is programmed to determine a region of interest based on information received by the on-board sensor network, and the processor is further programmed to classify one or more hazards in the region of interest, a hazard being an external object that is capable of moving into the vehicle's navigation path.

11. The vehicle according to claim 10, wherein
the processor is further programmed to classify the one or more hazards as one of a mobile hazard and a stationary hazard.

12. The vehicle according to claim 11, wherein
the processor is further programmed to determine a probability that the region of interest includes an occluded hazard based on classifying the detected hazards.

13. The vehicle according to claim 12, wherein
the processor of the virtual hazard inference system is programmed to adjust the navigation path of the vehicle upon determining that the probability exceeds the predetermined threshold.

14. The vehicle according to claim 1, wherein
the processor is programmed to further infer the presence of occluded objects not detected by the on-board sensor network based on previous navigation experience in the detection zone.

15. A method for controlling a vehicle based on an inferred virtual hazard, the method comprising:
detecting a presence of external objects within a detection zone by an on-board sensor network;
inferring a presence of an occluded object that is not detected by the on-board sensor network by a processor of a virtual hazard inference system based on a density of detected external objects in the detection zone; and
controlling a vehicle engine of the vehicle by the processor to decrease a torque output to decelerate the vehicle upon determining the presence of the occluded object.

16. The method according to claim 15, further comprising
controlling a steering control unit of the vehicle to alter the steering angle of the vehicle upon determining the presence of the occluded object such that the steering control unit steers the vehicle in a direction away from the occluded object.

17. The method according to claim 16, further comprising
inferring that the occluded object is moving in a direction towards the vehicle's navigation path by the processor.

18. The method according to claim 17, further comprising
inferring a speed of the occluded object by a processor based on an average speed of detected external objects within the detection zone of the on-board sensor network.

19. The method according to claim 18, further comprising
inferring the speed of the occluded object based on an average size of the detected external objects within the detection zone of the on-board sensor network by the processor in the event that the processor determines that none of the detected external objects are moving.

20. The method according to claim 19, further comprising
inferring the presence of the occluded object by the processor based at least one of
previous navigation experience in the detection zone,
a range of the detection zone, information acquired by the satellite navigation device, and information acquired by the telematics control unit and on-board sensor network.

* * * * *